(12) United States Patent
Mitts et al.

(10) Patent No.: US 6,935,823 B2
(45) Date of Patent: Aug. 30, 2005

(54) ANCHOR NUT DEVICE FOR ATTACHMENT TO A STRUCTURE

(75) Inventors: Richard K. Mitts, Fullerton, CA (US); Norbert A. Markl, Placentia, CA (US)

(73) Assignee: Illinois Tool Works Inc., Glenview, IL (US)

( * ) Notice: Subject to any disclaimer, the term of this patent is extended or adjusted under 35 U.S.C. 154(b) by 97 days.

(21) Appl. No.: 10/301,162

(22) Filed: Nov. 21, 2002

(65) Prior Publication Data

US 2003/0129041 A1 Jul. 10, 2003

Related U.S. Application Data

(60) Provisional application No. 60/333,354, filed on Nov. 26, 2001.

(51) Int. Cl.[7] ................................................ F16B 37/06
(52) U.S. Cl. ...................... 411/171; 411/175; 411/174; 411/111; 411/112; 411/113
(58) Field of Search ....................... 411/111, 112, 113, 411/171, 174, 175, 103, 114

(56) References Cited

U.S. PATENT DOCUMENTS

| | | | |
|---|---|---|---|
| 2,087,113 A | | 7/1937 | Owen |
| 2,191,632 A | | 2/1940 | Smith |
| 2,404,372 A | | 7/1946 | Hallock |
| 2,409,209 A | | 10/1946 | Johnson |
| 2,595,830 A | | 5/1952 | Demboske |
| 2,709,469 A | * | 5/1955 | Tripp et al. .................. 411/284 |
| 2,815,789 A | * | 12/1957 | Hutson et al. ............... 411/111 |
| 3,020,987 A | | 2/1962 | Schaurte |
| 3,163,198 A | * | 12/1964 | Zahodiakin .................. 411/112 |
| 3,219,086 A | * | 11/1965 | Zahodiakin .................. 411/112 |
| 3,640,327 A | * | 2/1972 | Burt ............................. 411/108 |
| 3,729,040 A | * | 4/1973 | Whiteside et al. ........... 411/103 |
| 3,765,078 A | * | 10/1973 | Gulistan ....................... 29/432 |
| 3,809,139 A | * | 5/1974 | Strain ........................... 411/183 |
| 3,960,048 A | | 6/1976 | Wagner .......................... 85/62 |
| 4,193,435 A | | 3/1980 | Frosch et al. ............. 151/41.76 |
| 4,263,831 A | * | 4/1981 | Smith ........................... 411/171 |
| 4,403,102 A | | 9/1983 | Jordan et al. ............. 174/16 HS |
| 4,462,710 A | | 7/1984 | Leitner .......................... 403/21 |
| 4,762,451 A | | 8/1988 | Collins ......................... 411/177 |
| 4,826,374 A | * | 5/1989 | Baglin .......................... 411/103 |
| 4,828,440 A | * | 5/1989 | Anderson et al. ............. 411/85 |
| 4,873,763 A | * | 10/1989 | Volonta et al. ............... 29/825 |
| 4,895,484 A | * | 1/1990 | Wilcox .......................... 411/85 |
| 5,020,952 A | * | 6/1991 | Zeigler et al. ............... 411/113 |
| 5,090,855 A | | 2/1992 | Terry ........................... 411/144 |
| 5,096,350 A | | 3/1992 | Peterson ...................... 411/112 |
| 5,193,643 A | | 3/1993 | McIntyre ..................... 180/312 |
| 5,253,949 A | | 10/1993 | Oxley et al. ................. 403/317 |
| 5,322,400 A | * | 6/1994 | Ford ............................ 411/171 |
| 5,697,746 A | | 12/1997 | Brown et al. ............... 411/396 |
| 5,782,194 A | | 7/1998 | Tipton ...................... 114/79 W |

FOREIGN PATENT DOCUMENTS

WO    WO009747892    * 12/1997   ......... F16B/39/284

* cited by examiner

Primary Examiner—Robert J. Sandy
Assistant Examiner—Katherine Mitchell
(74) Attorney, Agent, or Firm—Mark W. Croll; Paul F. Donovan

(57) ABSTRACT

An anchor nut device for attachment to a structure, the device defining a threaded bore for the reception therein of a corresponding member. The device includes an anchor nut which is fabricated from a first material, the nut defining the bore and a plurality of radially extending ears. A base plate is fabricated from a second material, the plate having a first and a second face, the first face cooperating with the plurality of ears. The second face of the plate defines a plurality of dimples for facilitating welding of the plate to the structure. A plurality of arms extend from the plate, such that each ear of the plurality of ears is disposed between a corresponding arm of the plurality of arms and the first face of the plate for capturing the nut relative to the plate. Also, a stop extends from the anchor nut, the stop being disposed between adjacent ears for controlling rotational movement of the anchor nut relative to the plate.

21 Claims, 4 Drawing Sheets

ANCHOR NUT DEVICE FOR ATTACHMENT TO A STRUCTURE

CROSS-REFERENCE TO RELATED APPLICATION

This application claims benefit to U.S. provisional application Ser. No. 60/333,354, filed on Nov. 26, 2001.

FIELD OF THE INVENTION

The present invention relates generally to an anchor nut device for attachment to a structure. More particularly, the present invention relates to an anchor nut device which defines a threaded bore for the rotatable reception therein of a correspondingly threaded member.

BACKGROUND OF THE INVENTION

In the automobile industry, anchor nuts are typically welded to an automotive body so that various bodywork members and accessories can be readily fastened to the automotive body. Essentially, an anchor nut includes a threaded nut which is attached to a plate so that when the plate is welded or otherwise fastened to the automotive body, an accessory can be attached to the auto body by a fastener which threadably cooperates with the threaded nut.

One of the advantages of the aforementioned anchor nut is that there is a certain amount of relative movement between the threaded nut and the plate. Such relative movement is particularly useful during robotic assembly of bodywork accessories so that the fastener is able to align with and engage the threaded nut.

However, during painting or e-coating of an auto body, there is a tendency for the dried paint to lock the threaded nut relative to the plate. The present invention includes an arrangement in which there is only a small area of contact between the threaded nut and the plate so that a dried film of paint between the threaded nut and the plate is easily broken such that the nut is permitted to float relative to the plate.

Therefore, it is a feature of the present invention to provide an anchor nut device for attachment to a structure that overcomes the problems associated with the prior art arrangements.

Another feature of the present invention is the provision of an anchor nut device for attachment to a structure that is reliable in use and that is relatively low in cost.

SUMMARY OF THE INVENTION

The present invention relates to an anchor nut device for attachment to a structure, the device defining a bore for the reception therein of a corresponding member. The device includes an anchor nut which is fabricated from a first material, the nut defining the bore. The nut also includes a plurality of radially extending ears. A base plate is fabricated from a second material, the plate having a first and a second face. The first face cooperates with the plurality of ears. The second face of the plate defines a plurality of dimples for facilitating welding of the plate to the structure. A plurality of arms extend from the plate, such that each ear of the plurality of ears is disposed between a corresponding arm of the plurality of arms and the first face of the plate for capturing the nut relative to the plate. Also, a stop extends from the anchor nut. The stop is disposed between adjacent ears for controlling rotational movement of the anchor nut relative to the plate.

In a more specific embodiment of the present invention, the first face includes a plurality of spacers disposed between the anchor nut and the base plate for spacing the anchor nut slightly from the base plate so that when the base plate has been welded and subsequently painted with a coating of paint, relative movement between the anchor nut and the base plate readily breaks the coating of paint for permitting relative movement and alignment of the anchor nut relative to the base plate.

Other features and advantages of the invention will become apparent to those skilled in the art upon review of the following detailed description, claims and drawings in which like numerals are used to designate like features.

Figure 1:
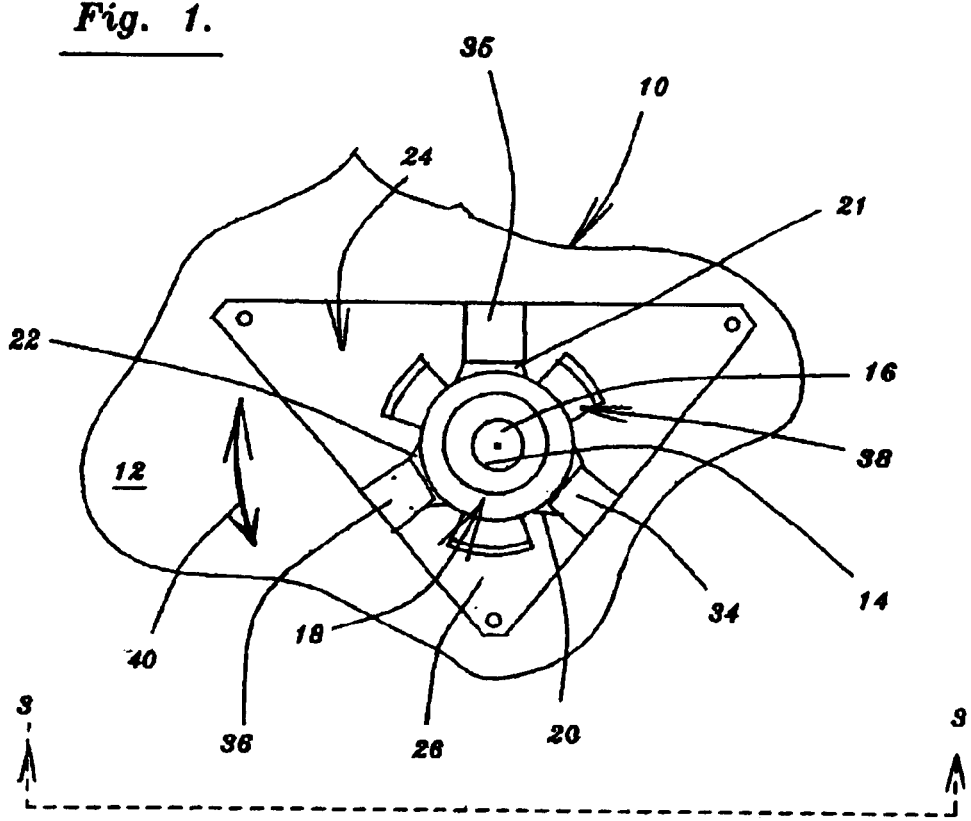
FIG. 1 is a top plan view of an anchor nut device according to the present invention for attachment to a structure.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE PREFERRED EMBODIMENTS

FIG. 1 is a top plan view of an anchor nut device generally designated 10 according to the present invention for attachment to a structure 12. As shown in FIG. 1, the device 10 defines a bore 14, which is a threaded bore in one embodiment, for the reception therein of a correspondingly member 16, which can be a threaded member. The device 10 includes an anchor nut generally designated 18 which is fabricated from a first material. The nut 18 defines the bore 14 and a plurality of radially extending ears 20, 21 and 22.

Figure 2:
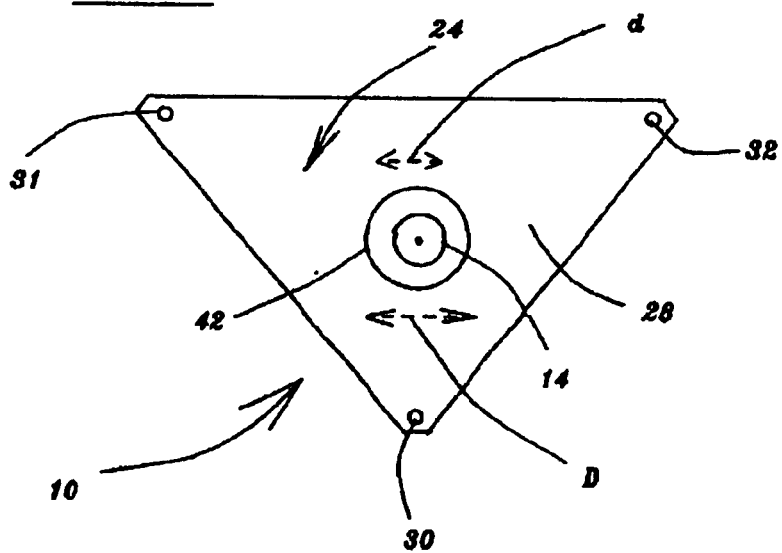
FIG. 2 is a bottom view of the device shown in FIG. 1.

FIG. 2 is a bottom view of the device 10 shown in FIG. 1. As shown in FIG. 2, a base plate generally designated 24 is fabricated from a second material, the plate 24 having a first and a second face 26 (FIG. 1) and 28 respectively. As shown in FIG. 1, the first face 26 cooperates with the plurality of ears 20–22. As shown in FIG. 2, the second face 28 of the plate 24 defines a plurality of dimples 30, 31 and 32 for facilitating welding of the plate 24 to the structure 12. As shown in FIG. 1, a plurality of arms 34, 35 and 36 extend from the plate 24, such that each ear such as ear 20 of the plurality of ears 20–22 is disposed between a corresponding arm such as arm 34 of the plurality of arms 34–36 and the first face 26 of the plate 24 for capturing the nut 18 relative to the plate 24. Also, a stop generally designated 38 extends from the anchor nut 18. The stop 38 is disposed between adjacent ears such as ears 20 and 21 for controlling rotational movement as indicated by the arrow 40 of the anchor nut 18 relative to the plate 24 so that limited rotational movement of the nut 18 relative to the plate 24 is permitted.

In a more specific embodiment of the present invention, the anchor nut 18 is fabricated from mild steel, which may be heat treated for higher tensile strength.

Also, the plurality of radially extending ears 20–22 includes a first ear 20, second ear 21 and a third ear 22. Adjacent ears such as ears 20 and 21 are spaced 120 degrees relative to each other and extend radially away from the bore 14.

Moreover, the base plate 24 is fabricated from weldable steel.

Furthermore, the base plate 24 is of triangular configuration.

As shown in FIG. 2, the base plate 24 defines a hole 42 which is aligned with the bore 14. More specifically, the hole 42 is circular in configuration. Also, the hole 42 has a greater diameter D than a diameter d of the bore 14.

Additionally, the first face 26 of the base plate 24 is planar.

Figure 3:
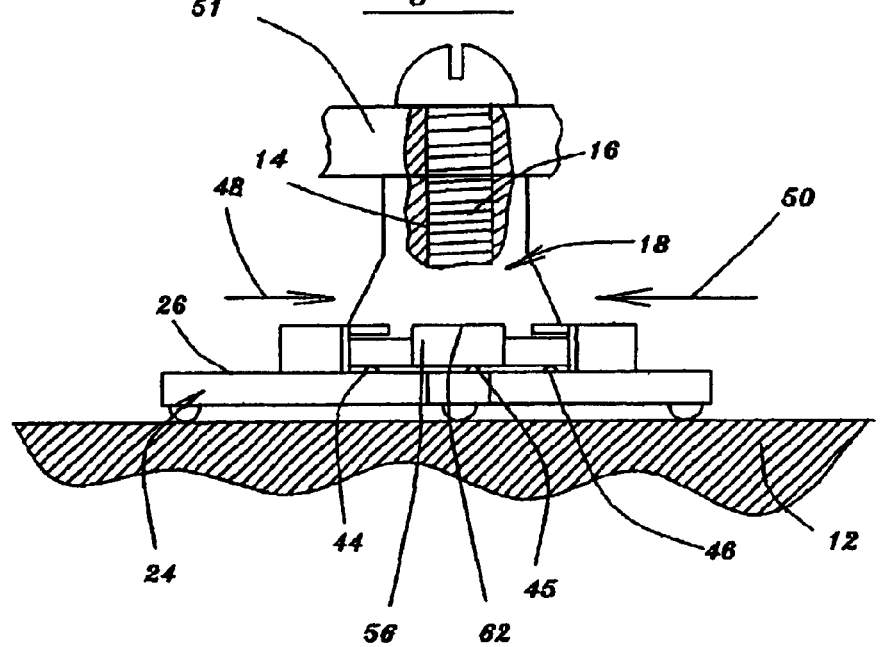
FIG. 3 is a view taken on the line 3—3 of FIG. 1.

FIG. 3 is a view taken on the line 3—3 of FIG. 1. As shown in FIG. 3, the first face 26 of the plate 24 includes a plurality of spacers 44, 45 and 46 or the like disposed between the anchor nut 18 and the base plate 24 for spacing the anchor nut 18 slightly from the base plate 24 so that when the base plate 24 has been welded and subsequently painted with a coating of paint (not shown), relative movement 40 between the anchor nut 18 and the base plate 24 readily breaks the coating of paint for permitting relative movement as indicated by the arrows 48 and 50 (see also FIG. 4) and alignment of the anchor nut 18 relative to the base plate 24. Those skilled in the art will appreciate that the spacers 44–46, although shown formed on the first face of the plate 24, could equally be formed from the anchor nut and would thus serve the same purpose.

Figure 4:
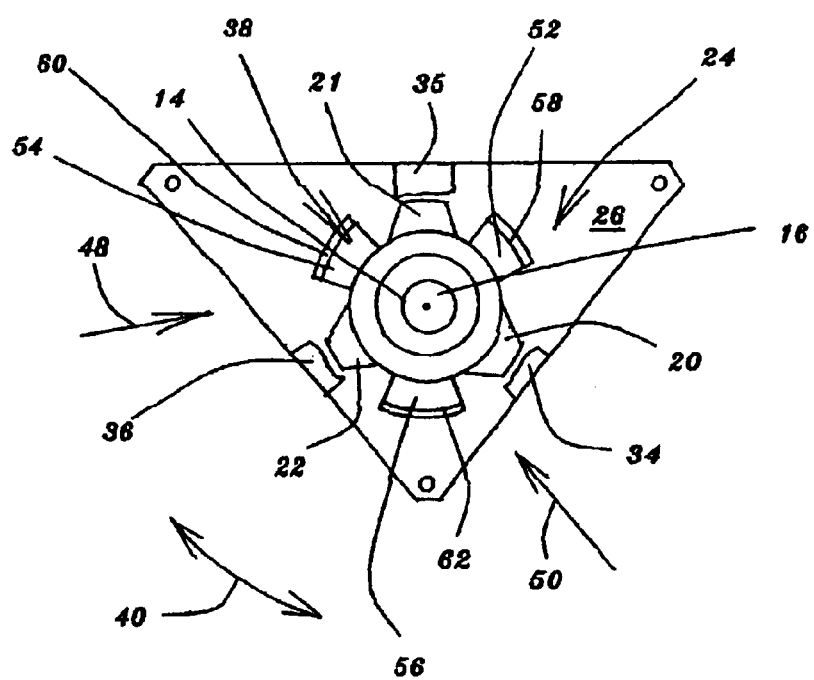
FIG. 4 is a fragmentary view of the device and is a similar view to that shown in FIG. 1.

FIG. 4 is a fragmentary view of the device 10 of FIG. 1 and is a similar view to that shown in FIG. 1. As shown in FIG. 4, the plurality of arms 34–36 includes a first arm 34 which cooperates with the first ear 20, a second arm 35 which cooperates with the second ear 21 and a third arm 36 which cooperates with the third ear 22.

Also, the first ear 20 is disposed between the first arm 34 and the first face 26 of the base plate 24. The second ear 21 is disposed between the second arm 35 and the first face 26 of the base plate 24. Furthermore, the third ear 22 is disposed between the third arm 36 and the first face 26 of the base plate 24.

More particularly, relative movement as indicated by the arrows 48 and 50 between each ear and each corresponding arm is permitted for permitting alignment of the bore 14 with the member 16 and an accessory 51 secured by the threaded member 16 as shown in FIG. 3. It should be noted that although accessory 51 is shown on being positioned on one side of the assembly, accessory 51 can be positioned on the opposite side of the assembly and threaded member 15 can be brought up through the assembly from the opposite side.

As shown in FIG. 4, relative movement between each ear such as ear 20 and each corresponding arm such as arm 34 is controlled while limited movement therebetween is permitted.

As shown in FIG. 4, the stop 38 includes a first portion 52 which is disposed between the first and second ear 20 and 21 respectively. A second portion 54 is disposed between the second and third ear 21 and 22 respectively. Also, a third portion 56 is disposed between the third and first ear 22 and 20 respectively. Each of the portions 52, 54 and 56 extend radially away from the bore 14.

Furthermore, the first portion 52 includes a first upstanding ridge 58 and the second portion 54 includes a second upstanding ridge 60. Moreover, the third portion 56 includes a third upstanding ridge 62. The ridges 58, 60 and 62 cooperate with adjacent arms 34–36 of the base plate 24 for limiting rotational movement 40 between the base plate 24 and the anchor 18.

Figure 5:
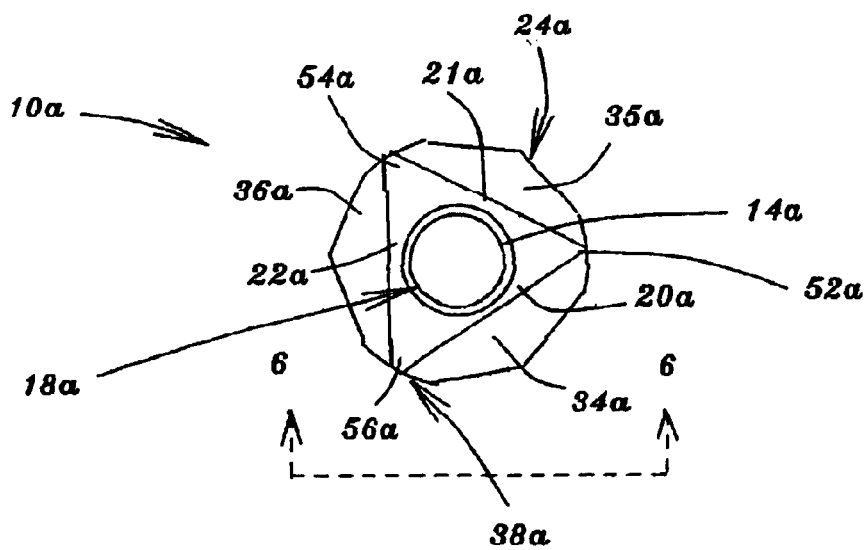
FIG. 5 is a top plan view of an alternative embodiment of the present invention.

FIG. 5 is a top plan view of an alternative embodiment of the present invention. As shown in FIG. 5, an anchor nut device 10a includes an anchor nut generally designated 18a and a base plate generally designated 24a. Arms 34a, 35a and 36a respectively extend from the plate 24a and wrap around ears 20a, 21a and 22a respectively which extend radially outwardly from a bore 14a of the nut 18a. Also, a first, second and third portion 52a, 54a and 56a extend radially outwardly from the bore 14a of the nut 18a. The arrangement is such that the first portion 52a of the stop generally designated 38a is disposed between the ear 20a and ear 21a respectively.

Figure 6:
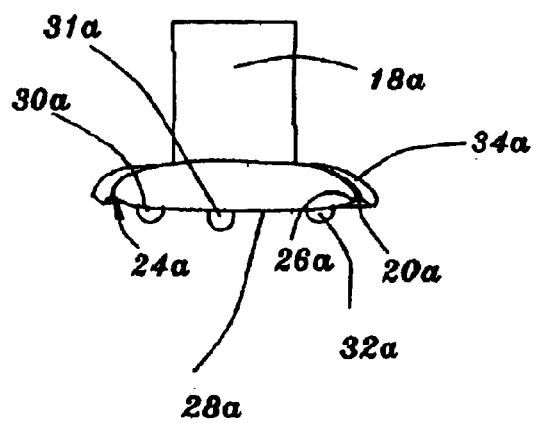
FIG. 6 is a view taken on the line 6—6 of FIG. 5.

FIG. 6 is a view taken on the line 6—6 of FIG. 5. As shown in FIG. 6, the ear 20a is disposed between the arm 34a and a first face 26a of the plate 24a. Also, dimples 30a, 31a and 32a are provided on a second face 28a of the plate 24a for assisting welding of the plate 24a to a structure 12a.

In the embodiment shown in FIGS. 5 and 6, although portions 52a, 54a and 56a are provided for preventing relative rotation between the nut 18a and the plate 24a, the arms 34a–36a are crimped against the nut 18a so that there is no limited relative movement between the nut 18a and the plate 24a. Accordingly, in the embodiment shown in FIGS. 5–6, there is no need for any spacers between the nut 18a and the first face 26a of the plate 24a.

Figure 7:
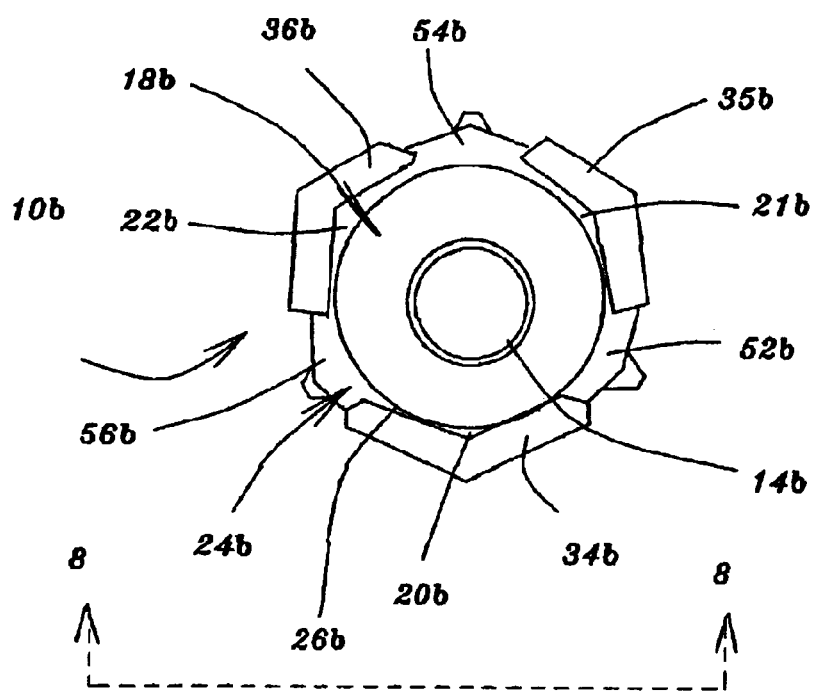
FIG. 7 is a top plan view of another alternative embodiment of the anchor nut device according to the present invention.

FIG. 7 is a top plan view of another alternative embodiment of the anchor nut device according to the present invention. As shown in FIG. 7, an anchor nut device 10b includes an anchor nut generally designated 18b. The nut 18b includes ears 20b, 21b and 22b respectively which extend radially from a bore 14b defined by the nut 18b. A plate generally designated 24b includes arms 34b, 35b and 36b which cooperate respectively with the ears 20b–22b. The arrangement is such that the first ear 20b is disposed between the arm 34b and a first face 26b of the plate 24b. As in the case of the embodiment shown in FIGS. 5–6, portions 52b, 54b and 56b extend radially outwardly from the nut 18b so that for example portion 52b is disposed between ears 20b and 21b. The arms 34b–36b are crimped or otherwise bent over the corresponding ears 20b–22b so that any relative movement between the nut 18b and the plate 24b is prevented.

Figure 8:
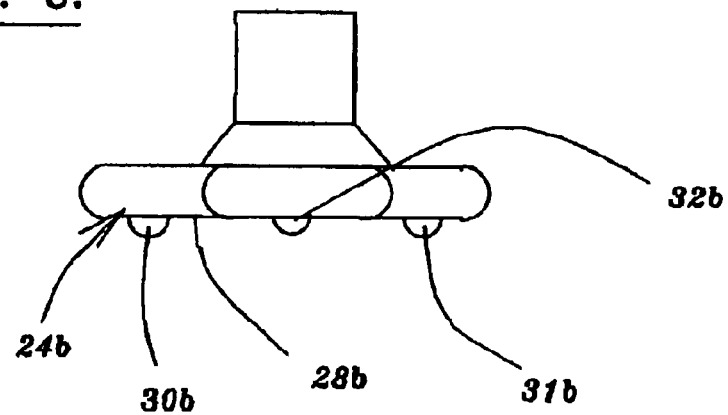
FIG. 8 is a view taken on the line 8—8 of FIG. 7.

FIG. 8 is a view taken on the line 8—8 of FIG. 7. As shown in FIG. 8, a second face 28b of the plate 24b is provided with dimples 30b, 31b and 32b for assisting welding of the plate 24b to the structure 12b.

In operation of the device according to the present invention, in each of the embodiments shown in FIGS. 1–4, 5–6 and 7–8, the plate 24, 24a and 24b is welded to the structure such as an auto body. In the case of the device shown in FIGS. 1–4, when the auto body is coated with paint, the paint will dry thus tending to secure the nut 18 relative to the plate 24. However, when an accessory 51 is to be fastened to the auto body structure 12, the member 16 such as a bolt will be threaded through the accessory and the associated threaded bore 14 so that any slight rotational movement 40 or movement 48 or 50 will easily break the film of paint due to the provision of the spacers 44–46.

The provision of the device 10 with dissimilar metals permits use of a relatively low cost material for the plate 24 which can be readily welded to the auto body while the nut 18 may be fabricated from a high quality steel which reliably cooperates with the member 16.

In the embodiments shown in FIGS. 5–6 and 7–8, the aforementioned features of the embodiment shown in FIGS. 1–4 are incorporated therein with the exception of the provision for relative movement between the nut and the plate. Such an arrangement is particularly useful where the accessory is located in a location that is easily accessible for attachment to the auto body and alignment of the threaded member and the threaded bore is easily attained.

The present invention provides a unique anchor nut device for attachment to a structure.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. An anchor nut device for attachment to a structure, said device defining a bore for the reception therein of a corresponding member, said device comprising:
    an anchor nut fabricated from a first material, said nut including a nut body defining the bore, and a plurality of radially extending ears, each ear including a first end connected to or extending from said nut body and a second distal end;
    a base plate fabricated from a second material, said plate having a first and a second face, said first face cooperating with said plurality of ears, said second face of said plate defining a plurality of dimples for facilitating welding of said plate to the structure;
    a plurality of arms extending from said plate, each arm including a first vertical portion that extends off of and away from said plate and a second portion that extends from said first vertical portion in such a manner so as to be generally parallel with said plate, said arms being arranged so that each ear of said plurality of ears is disposed between a corresponding arm of said plurality of arm and said first face of said plate for capturing and securing said nut relative to said plate, each distal end of said plurality of ears being disposed directly adjacent to the corresponding first vertical portion and directly beneath the corresponding second portion of said plurality of arms after said nut is captured and secured to said plate; and
    at least one stop extending from said anchor nut, said at least one stop being disposed between adjacent ears for controlling and allowing rotational movement of said anchor nut relative to said plate after said nut is captured and secured to said plate.

2. An anchor nut device as set forth in claim 1, wherein said anchor nut is fabricated from mild steel.

3. An anchor nut device as set forth in claim 1, wherein said plurality of radially extending ears include a first, second and a third ear, adjacent ears being spaced 120 degrees relative to each other and extending radially away from the bore.

4. An anchor nut device as set forth in claim 3, wherein said plurality of arms includes a first arm which cooperates with said first ear, a second arm which cooperates with said second ear, and a third arm which cooperates with said third ear.

5. An anchor nut device as set forth in claim 4, wherein said first ear is disposed between said first arm and said first face of said base plate, said second ear is disposed between said second arm and said first face of said base plate, and said third ear is disposed between said third arm and said first face of said base plate.

6. An anchor nut device as set forth in claim 5, wherein relative movement between each ear and each corresponding arm is permitted for permitting alignment of the bore with threaded member.

7. An anchor nut device as set forth in claim 5, wherein relative movement between each ear and each corresponding arm is inhibited.

8. An anchor nut device as set forth in claim 4, wherein said at least one stop includes a first stop portion disposed between said first and second ear, a second stop portion disposed between said second and third ear, and a third stop portion disposed between said third and first ear, said portions extending radially away from the threaded bore.

9. An anchor nut device as set forth in claim 8, wherein said first stop portion includes a first upstanding ridge, said second stop portion includes a second upstanding ridge, and said third stop portion includes a third upstanding ridge, said ridges cooperating with adjacent arms of said base plate for limiting rotational movement between said base plate and said anchor nut.

10. An anchor nut device as set forth in claim 1, wherein said base plate is fabricated from weldable steel.

11. An anchor nut device as set forth in claim 1, wherein said base plate is of triangular configuration.

12. An anchor nut device as set forth in claim 1, wherein said base plate defines a hole which is aligned with the bore.

13. An anchor nut device as set forth in claim 12, wherein said hole is circular in configuration.

14. An anchor nut device as set forth in claim 13, wherein said hole has a greater diameter than a diameter of the bore.

15. An anchor nut device as set forth in claim 1, wherein said first face of said base plate is planar.

16. An anchor nut device for attachment to a structure, said device defining a bore for the reception therein of a corresponding member, said device comprising:
    an anchor nut fabricated from a first material, said nut defining the bore, and a plurality of radially extending ears;
    a base plate fabricated from a second material, said plate having a first and a second face, said first face cooperating with said plurality of ears, said second face of said plate defining a plurality of dimples for facilitating welding of said plate to the structure;
    a plurality of arms extending from said plate, such that each ear of said plurality of ears is disposed between a corresponding arm of said plurality of arms and said first face of said plate for capturing and securing said nut relative to said plate; and a stop extending from said anchor nut, said stop being disposed between adjacent ears for controlling and allowing rotational movement of said anchor nut relative to said plate;

wherein said first face includes a plurality of spacers disposed between said anchor nut and said base plate for spacing said anchor nut slightly from said base plate so that when said base plate has been welded and subsequently painted with a coating of paint or the like, relative movement between said anchor nut and said base plate readily breaks said coating of paint for permitting relative movement and alignment of said anchor nut relative to said base plate.

17. An anchor nut device for attachment to a structure, said device defining a bore for the reception therein of a corresponding member, said device comprising:

an anchor nut fabricated from a first material, said nut including a nut body defining the bore, and a plurality of radially extending ears, each ear including a first end connected to or extending from said nut body and a second distal end;

a base plate fabricated from a second material, said plate having a first and a second face, said first face cooperating with said plurality of ears; and a plurality of arms extending from said plate, each arm including a first vertical portion that extends off of and away from said plate and a second portion that extends from said first vertical portion in such a manner so as to be generally parallel with said plate, said arms being arranged so that each ear of said plurality of cars is disposed between a corresponding arm of said plurality of arms and said first face of said plate for capturing and securing said nut relative to said plate, each distal end of said plurality of ears being disposed directly adjacent to the corresponding first vertical portion and directly beneath the corresponding second portion of said plurality of arms after said nut is captured and secured to said plate.

18. An anchor nut according to claim 17, wherein said second face of said base plate includes a plurality of dimples for facilitating welding of said plate to the structure.

19. An anchor nut device for attachment to a structure, said device defining a threaded bore for the rotatable reception therein of a correspondingly threaded member, said device comprising:

an anchor nut fabricated from a first material, said nut defining the threaded bore and a plurality of radially extending ears;

a base plate fabricated from a second martial, said plate having a first and a second face, said first face cooperating with said plurality of ears, said second face of said plate defining a plurality of dimples for facilitating welding of said plate to the structure;

a plurality of arms extending from said plate, such that each ear of said plurality of ears is disposed between a corresponding arm of said plurality of arms and said first face of said plate for capturing said nut relative to said plate;

at least one stop extending from said anchor nut, said at least one stop being disposed between adjacent ears for controlling rotational movement of said anchor nut relative to said plate; and wherein said first face of said plate includes a plurality of spacers disposed between said anchor nut and said base plate for spacing said anchor nut slightly from said base plate so that when said base plate has been welded and subsequently painted with a coating of paint, relative movement between said anchor nut and said base plate readily breaks said coating of paint for permitting relative movement and alignment of said anchor nut relative to said base plate such that relative movement between each ear and each corresponding arm is permitted for attaining alignment of the threaded bore with the threaded member.

20. An anchor nut device for attachment to a structure, said device defining a bore for the reception therein of a corresponding member, said device comprising:

an anchor nut fabricated from a first material, said nut defining the bore and a plurality of radially extending ears;

a base plate fabricated from a second material, said plate having a first and a second face, said first face cooperating with said plurality of ears, said second face of said plate defining a plurality of dimples for facilitating welding of said plate to the structure;

a plurality of arms extending from said plate, such that each ear of said plurality of ears is disposed between a corresponding arm of said plurality of arms and said first face of said plate for capturing said nut relative to said plate;

a stop extending from said anchor nut, said stop being disposed between adjacent ears for controlling rotational movement of said anchor nut relative to said plate; and wherein said first face includes a plurality of spacers disposed between said anchor nut and said base plate for spacing said anchor nut slightly from said base plate so that when said base plate has been welded and subsequently painted with a coating of paint or the like, relative movement between said anchor nut and said base plate readily breaks said coating of paint for permitting relative movement and alignment of said anchor nut relative to said base plate.

21. An anchor nut device for attachment to a structure, said device defining a bore for the reception therein of a corresponding member, said device comprising:

an anchor nut fabricated from a mild steel, said nut including a nut body defining the bore, and a plurality of radially extending ears, each ear including a first end connected to or extending from said nut body and a second distal end;

a base plate of triangular configuration fabricated from a weldable steel, said plate having a first and a second face, said first face cooperating with said plurality of ears, said second face of said plate defining a plurality of dimples for facilitating welding of said plate to the structure;

a plurality of arms extending from said plate, such that each ear of said plurality of ears is disposed between a corresponding arm of said plurality of arms and said first face of said plate for capturing and securing said nut relative to said plate;

at least one stop extending from said anchor nut, said at least one stop being disposed between adjacent ears for controlling and allowing rotational movement of said anchor nut relative to said plate;

wherein said at least one stop includes a first stop portion disposed between said first and second ear, a second stop portion disposed between said second and third ear, and a third stop portion disposed between said third and first ear, said portions extending radially away from the threaded bore; and wherein said first stop portion includes a first upstanding ridge, said second stop portion includes a second upstanding ridge, and said third stop portion includes a third upstanding ridge, said ridges cooperating with adjacent arms of said base plate for limiting rotational movement between said base plate and said anchor nut.

* * * * *